(12) United States Patent
Shanmugalingam et al.

(10) Patent No.: US 10,165,497 B2
(45) Date of Patent: Dec. 25, 2018

(54) DEVICE FOR CONTROLLING AN IP CORE NETWORK AND CONTROL METHOD IMPLEMENTED BY THIS DEVICE

(71) Applicant: ORANGE, Paris (FR)

(72) Inventors: Sivasothy Shanmugalingam, Rennes (FR); Philippe Bertin, Acigne (FR)

(73) Assignee: ORANGE, Paris (FR)

( * ) Notice: Subject to any disclaimer, the term of this patent is extended or adjusted under 35 U.S.C. 154(b) by 13 days.

(21) Appl. No.: 14/901,975

(22) PCT Filed: Jun. 26, 2014

(86) PCT No.: PCT/FR2014/051630
§ 371 (c)(1),
(2) Date: Dec. 29, 2015

(87) PCT Pub. No.: WO2015/001232
PCT Pub. Date: Jan. 8, 2015

(65) Prior Publication Data
US 2016/0174131 A1    Jun. 16, 2016

(30) Foreign Application Priority Data
Jul. 2, 2013 (FR) ...................................... 13 56435

(51) Int. Cl.
*H04W 40/24* (2009.01)
*H04L 12/24* (2006.01)
(Continued)

(52) U.S. Cl.
CPC ........... *H04W 40/248* (2013.01); *H04L 41/12* (2013.01); *H04W 8/02* (2013.01); *H04W 24/02* (2013.01)

(58) Field of Classification Search
CPC ....... H04W 40/248; H04W 8/02; H04W 8/08; H04W 8/22; H04W 8/24;
(Continued)

(56) References Cited

U.S. PATENT DOCUMENTS

| 2011/0269447 | A1* | 11/2011 | Bienas | .................... | H04W 8/22 |
| | | | | | 455/422.1 |
| 2014/0022996 | A1* | 1/2014 | Punz | ....................... | H04W 8/12 |
| | | | | | 370/328 |

(Continued)

OTHER PUBLICATIONS

Jin et al, SoftCell: Taking Cotrol of Cellular Core Networks; May 15, 2013.*

(Continued)

*Primary Examiner* — Pao Sinkantarakorn
(74) *Attorney, Agent, or Firm* — Knobbe, Martens, Olson & Bear, LLP

(57) ABSTRACT

One embodiment relates to a device for controlling an IP core network including at least one router to an external data packet network and at least one switch connected to the router and to at least one base station of an access network. It may comprise a communication module configured to communicate with a mobility management entity of the core network and to receive information therefrom representative of a mobility state and/or an IP connectivity state of a terminal. It may comprise a module configured to update topology information representing connections between the router(s), the switch(es), the base station(s), and registered terminals, and to update at least some of the topology information as a function of the state information. It may comprise a control module configured to control the router(s) and/or the switch(es) with processing rules applied to data streams for the terminals, which are defined from the updated information.

19 Claims, 6 Drawing Sheets

(51) Int. Cl.
*H04W 8/02* (2009.01)
*H04W 24/02* (2009.01)

(58) Field of Classification Search
CPC ... H04W 64/00–64/006; H04W 92/12; H04W 92/14
USPC .................................................. 370/351–430
See application file for complete search history.

(56) References Cited

U.S. PATENT DOCUMENTS

2014/0126448 A1* 5/2014 Punz ................. H04W 52/0222
370/311
2015/0245325 A1* 8/2015 Futaki .................. H04W 72/04
370/329

OTHER PUBLICATIONS

3rd Generation Partnership Project. Jun. 2013. Technical Specification Group Services and Systems Aspects; General Packet Radio Service (GPRS) enhancements for Evolved Universal Terrestrial Radio. Access Network (E-UTRAN) access (Release 12). 3GPP TS 23.401, V12.1.0, 291 pages.

Hampel et al. Apr. 14, 2013. Applying Software-Defined Networking to the Telecom Domain. Computer Communications Workshops (INFOCOM WKSHPS), 16th IEEE Global Internet Symposium, pp. 133-138.

Jin et al. May 15, 2013. SoftCell: Taking Control of Cellular Core Networks. Cornell University Library. Retrieved from the Internet Feb. 4, 2014, URL:http://arxiv.org/pdf/1305.3568v1.pdf. 14 pages.

Kempf et al. 2012. Moving the Mobile Evolved Packet Core to the Cloud. 2012 Fifth International Workshop on Selected Topics in Mobile and Wireless Computing. IEEE, pp. 784-791.

Open Networking Foundation. Apr. 13, 2012. Software-Defined Networking: The New Norm for Networks. 12 pages.

Open Networking Foundation. Sep. 6, 2012. OpenFlow Switch Specification. Version 1.3.1 (Wire Protocol 0x04). ONF TS-007. 128 pages.

Pentikousis et al. Jul. 1, 2013. MobileFlow: Toward Software-Defined Mobile Networks. IEEE Communications Magazine, 51(7):44-53.

Shimonishi et al. Apr. 19, 2010. Virtualized network infrastructure using OpenFlow. 2010 IEEE/IFIP Network Operations and Management Symposium Workshops (NOMS WKSPS), pp. 74-79.

International Search Report dated Sep. 19, 2014 for International Application No. PCT/FR2014/051630 filed Jun. 26, 2014.

* cited by examiner

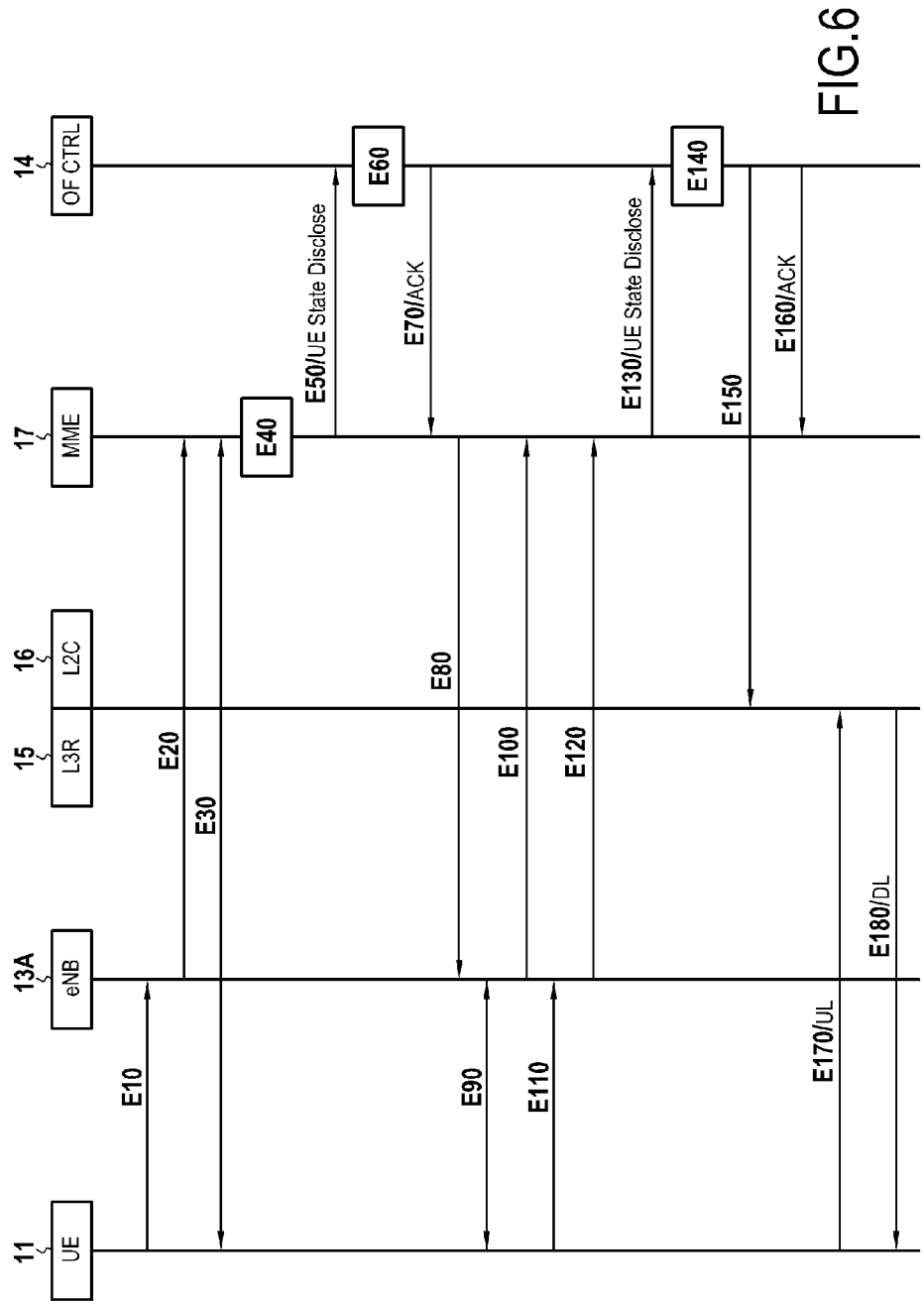

DEVICE FOR CONTROLLING AN IP CORE NETWORK AND CONTROL METHOD IMPLEMENTED BY THIS DEVICE

RELATED APPLICATIONS

This application is the U.S. National Phase of Application No. PCT/FR2014/051630 entitled "DEVICE FOR CONTROLLING AN IP CORE NETWORK AND CONTROL METHOD IMPLEMENTED BY THIS DEVICE" filed Jun. 26, 2014, which designated the United States, and which claims the benefit of French Application No. 1356435 filed Jul. 2, 2013.

BACKGROUND OF THE INVENTION

The invention relates to the general field of telecommunications and it relates more particularly to an architecture for an Internet protocol (IP) core network. The invention thus applies in preferred, but non-limiting, manner to communication networks complying with the long term evolution (LTE) standard defined by the third generation partnership project (3GPP) standardization consortium, and more specifically to the architecture of an LTE core network with an evolved packet core (EPC).

Exponential growth in mobile telecommunications traffic is expected in the coming years, propelled by the appearance of new applications, new terminals, and ever-faster communication data rates.

In this context, the LTE/EPC architecture has been defined by the 3GPP consortium to provide transparent IP connectivity between a user's terminal, also known as user equipment (UE), and packet data networks (PDNs) suitable for offering a variety of communication services to the terminal, such as voice over IP (VoIP) services, data downloading, video on demand, etc. This architecture relies on:
  an access network known as an evolved universal terrestrial radio access network (E-UTRAN) to which the user terminal is connected via a base station known as an eNodeB (eNB); and
  an IP core network (or EPC) managing data exchanges in uplink and downlink between the terminal and the data packet networks connected to the core network.

FIG. 1 is a diagram showing the various pieces of network equipment on which the LTE/EPC architecture relies, as presently defined by the 3GPP consortium, and in particular as described in the document 3GPP TS 23.401 entitled "Technical specification group services and system aspects; general packet radio service (GPRS) enhancements for evolved universal terrestrial radio access network (E-UTRAN) access", Release 12, March 2013. As an indication, the exchanges provided between those pieces of equipment for transferring data (i.e. in the data plane or user plane) are represented by continuous lines, whereas the signaling exchanges provided between these pieces of equipment in order to handle the data transfers (i.e. in the control or signaling plane) are represented by dashed lines.

More precisely, in FIG. 1, the EPC core network 1 enables a UE terminal 2 that is attached to (i.e. served by) an eNB base station 3A of an access network such as a mobile telecommunications network to access services made available by an external PDN 4. For this purpose, the EPC core network 1 has four types of equipment, namely:
  a data transfer gateway 5, also known as a serving gateway S-GW, situated between the access network and the core network 1;
  an interconnection gateway 6, also known as a PDN gateway (P-GW), for connecting the core network 1 to the external data packet network 4;
  an equipment 7 for managing terminal mobility, also known as mobility management entity (MME) equipment, in charge of ensuring IP connectivity for terminals when they are in a handover situation; and
  a user database 8, also known as the home subscriber server (HSS) of the network.

The base stations 3A and 3B are directly connected to the MME equipment 7 and to the S-GW data transfer gateway 5 via respective interfaces S1-MME and S1-U.

The MME equipment 7 manages the mobility and the IP connectivity of the terminal 2 (i.e. its network connectivity). It is responsible for authenticating the terminal (in order to authorize it to access the core network 1), and it manages the setting up of communication sessions for the terminal and also intra-3GPP mobility.

The S-GW and P-GW gateways 5 and 6 are responsible for transferring data within the core network 1, for managing mobility, and for controlling quality of service in the data plane.

The MME equipment 7 is connected to the S-GW data transfer gateway 5 via a logic interface S11. The S-GW data transfer gateway 5 is connected to the P-GW interconnection gateway 6 via an interface S5.

The LTE/EPC architecture as presently defined by the 3GPP consortium is not truly optimized and it makes it difficult for operators to integrate new services in IP core networks.

More precisely, this architecture relies at present on the GPRS tunneling protocol (GTP) for managing the mobility of terminals within the network. This protocol comprises several components, including:
  the GTP-U protocol that is used for transferring (exchanging) user data between two separate communication tunnels, in order to manage mobility situations of the user terminal over the interfaces S1 and S5; and
  the GTP-C protocol used for setting up, updating, and maintaining the GTP communication tunnels. Signaling exchanges over the interfaces S11 and S5 rely on the GTP-C protocol.

It should be observed that distinct GTP communication tunnels are set up for the various types of traffic that are exchanged in the network (i.e. for each quality of service), and more specifically for each packet data protocol (PDP) communication session managed by the core network. The PDP communication protocol thus contributes not only to managing terminal mobility, but also to managing the quality of service in the network.

The GTP protocol is used on top of the transport protocol implemented in the network, i.e. typically on top of the user data protocol (UDP) or possibly the transmission control protocol (TCP), which is itself executed on top of the IP protocol. Using the GTP protocol thus results in adding several headers (i.e. GTP, UDP/TCP, and IP headers) to each data packet passing through the core network, thereby significantly increasing the quantity of signaling that is exchanged between the various pieces of network equipment in order to manage the mobility of terminals and the quality of service of communications.

Furthermore, P-GW gateways for interconnecting with external packet networks and S-GW gateways for transferring data as presently provided in the LTE/EPC architecture are inflexible and generally programmed on specialized hardware. That kind of implementation provides little flexibility in terms of reusing and/or reorganizing resources.

Those two examples show up clearly the limits of the present LTE/EPC architecture concerning integrating new services.

The document by J. Kempf et al., entitled "Moving the mobile evolved packet core to the cloud", 5th International Workshop on Selected Topics in Mobile and Wireless Computing, 2012, proposes an evolution of the LTE/EPC core network architecture defined by the 3GPP consortium in which the data and control planes are separate, and that uses the principle of software defined networking (SDN). In known manner, an SDN architecture makes it possible to decouple the control and data planes by centralizing the intelligence of the network (i.e. the control functions of the network) in a software control device. The behavior of pieces of network equipment is then defined by rules received from the control device, such as rules for processing or transferring data (i.e. traffic). The SDN concept relies on the OpenFlow™ communication protocol as defined by the open networking foundation (ONF) that enables pieces of network equipment to be programmed in simplified manner, via a standard interface.

More specifically, the document by J. Kempf et al. proposes shifting the present functions of MME equipment, and also the control plane of S-GW data transfer gateways and of the P-GW interconnection gateway to applications that execute on top of a control device implemented by a virtual machine in an external data center, also referred to as a computer "cloud". These applications interact with the software control device via application programming interfaces (APIs). Equipment in the data plane of the transfer gateways and of the interconnection gateway, is replaced by OpenFlow™ switches; the control device is responsible for setting up the data plane.

Although that proposal simplifies the configuration of core network equipment, it nevertheless relies on the same interfaces between the control entities of the network as are defined by the 3GPP consortium and as mentioned above (i.e. the interfaces S1, S11, and S5 using the GTP protocol). The solution proposed by J. Kempf et al. thus cannot remedy the above-mentioned drawbacks in full. In particular, it does not make it possible to reduce the signaling that is induced by setting up GTP communication tunnels between the entities of the network for the purpose of improving resource management within the network and in order to enable new services to be supported by the operators of IP core networks.

Another core network architecture is proposed in the article "SoftCell: taking control of cellular core networks" by Xin Jin et al., Cornell University Library, published on May 15, 2013. That architecture comprises a controller, core switches, and distributed intermediate equipment referred to as "middleboxes", such as firewalls, transcoders, etc. A particular function of the controller is to group together the data streams in a plurality of dimensions (i.e. policies, base stations and terminals) as aggregates of multidimensional streams that are managed by the access switches of the base stations, and it therefore needs to control the base stations directly in order to act on the aggregation of those streams. Furthermore, traffic type needs to be taken into account in order to define the middleboxes used by the data streams, in particular while they are being aggregated in the base stations, thereby making the definition of the data plane more complex, while involving limits as a result of the need to take account of this type of parameter.

This other architecture is found to be particularly complex since it makes it necessary, in the controller, to make use of user attributes and terminal attributes, and also to modify IP headers from location-dependent addresses. Unfortunately, following a handover, a terminal may need to change such a location-dependent address, and that requires old streams to be routed over an address that is different from new streams. Finally, that architecture necessarily has an impact on the base stations and the MME type radio control elements, since it is necessary for the setting up of GTP tunnels not to be controlled by an MME, unlike that which is done in the 3GPP standard.

OBJECT AND SUMMARY OF THE INVENTION

The invention provides a solution to this problem, in particular by providing a control device for controlling an IP core network, the IP core network including at least one router to an external data packet network and at least one switch connected to said at least one router, said at least one switch being connected to at least one base station of an access network. In accordance with the invention, the control device comprises:

a communication module for communicating with a mobility management entity of the IP core network and suitable for receiving state information from the entity that is representative of a mobility state and/or an IP connectivity state of a terminal;

an updating module for updating topology information representing connections existing between said at least one router, said at least one switch, said at least one base station, and terminals registered with the core network, the module being suitable for updating at least some of the topology information as a function of the state information received from the mobility management entity; and a control module for controlling said at least one router and/or said at least one switch by means of processing rules to be applied to data streams for the terminals registered with the core network, the processing rules being defined on the basis of the updated topology information.

Correspondingly, the invention also provides a control method for implementing by a control device for controlling an IP core network including at least one router to an external data packet network and at least one switch connected to said at least one router, said at least one switch being connected to at least one base station of an access network, the method comprising:

a reception step for receiving state information from a mobility management entity of the IP core network, which state information is representative of a mobility state and/or an IP connectivity state of a terminal;

an updating step for acting as a function of the state information to update at least one information item from topology information representative of connections existing between said at least one router, said at least one switch, said at least one base station, and terminals registered with the core network; and an actualizing step for acting on said at least one item of updated topology information to actualize at least one processing rule used by the control device to control said at least one router and/or said at least one switch and for application to data streams for said terminal.

The invention thus relies on the principles of software-defined networking for the purpose of decoupling the data plane and the control plane in the IP core network. This leads to a novel architecture for the IP core network that is programmable and that enables the data plane to be (re)configured dynamically.

More precisely, the invention proposes using a control device, e.g. a software control device, to control a relatively simple data plane relying on routers (operating at the level of layer 3 of the OSI model) and on switches (operating at the level of layer 2 of the OSI model) that are deployed in the IP core network. Each router is connected to one or more switches, and each switch is connected to one or more base stations of an access network. In accordance with the invention, the routers and the switches are programmable by means of processing rules defined by the control device and updated as a function of the current topology of the network. This topology, which may be modeled by means of a tree structure, reflects the connections that exist between the routers, the switches, the base stations, and the terminals registered with the IP core network and connected, where applicable, to the base stations (in other words the connections existing in the core network and/or the access network). Thus, the invention makes it possible to adapt the routing/transfer of various data streams within the network as a function of various parameters associated with the topology of the network (e.g. traffic conditions, load of pieces of equipment, quality of service (QoS), resilience, security, etc.), without requiring subsequent intervention by the mobility management entity or any other entity of the core network.

In order to actualize the network topology information used by the control device in order to define the processing rules, the invention advantageously relies on a definition of a communication interface between the control device and the mobility management entity of the core network. This interface makes provision, in particular, for the mobility management entity to transmit "state" information to the control device relating to the state of terminals served by the base stations that are connected to the mobility management entity. The term "state" as used herein of a terminal, is used to mean an IP connectivity state and/or a mobility state of that terminal.

Thus, by way of example, the state information received from the mobility management entity may be representative of at least one state selected from:
 a state of being registered or not registered with the IP core network; and/or
 a state of being connected or idle.

It may also include an identifier of the base station of the access network to which the terminal is attached (i.e. connected), together with an identifier of the terminal (e.g. an IP address and/or a network identifier such as an international mobile subscriber identity (IMSI)). These elements enable the network topology information to be updated, and in particular information about the IP connectivity of base stations and terminals. The base station identifier is particularly important when the terminal is in a handover situation, going from one base station to another, where it serves to inform the control device of the base station to which the handover has been performed.

The mobility management entity obtains this state information from messages it exchanges with the base stations: because of its function within the core network, this entity receives various messages from base stations, in particular during procedures for attaching terminals, for performing a handover between two base stations, etc., that enable it to determine the current state of a terminal.

The new core network architecture proposed by the invention, and in particular the direct interface between the mobility management entity and the control device, thus makes it easy to manage the mobility of terminals within the network and to avoid setting up GTP communication tunnels as presently provided for by the 3GPP consortium. This leads to signaling that is limited in the headers of the packets transporting the data.

More precisely, the S-GW data transfer and P-GW interconnection gateways defined in the LTE/EPC architectures proposed by the 3GPP consortium and by J. Kempf et al. are replaced, in accordance with the invention, by switches and routers that are controlled by the control device and that operate respectively at the levels of layers 2 and 3 of the network. Such switches and routers exchange IP data packets without setting up GTP tunnels. Since the switches are also themselves connected to the base stations, they can likewise send and/or receive IP packets instead of packets that have been encapsulated in the GTP.

In other words, the base stations in the architecture of the invention are similar to those of the prior art with the exception that they now send and/or receive IP data packets to and/or from switches instead of GTP data packets to and/or from S-GW data transfer gateways. As a result, the messages that are exchanged between the base stations and the mobility management entity of the core network for the purposes of creating, modifying, and/or terminating GTP tunnels set up with S-GW gateways are no longer needed. Furthermore, no interface is required between the mobility management entity and the routers/switches of the core network, since they communicate directly with the base stations.

It should be observed that the new data plane defined by the invention is generalized (i.e. standard) and relatively simple: it is independent of the type of traffic being exchanged between the various pieces of equipment of the network. It can thus be used efficiently to implement a variety of communication services, thereby making it possible to reduce the development times and the hardware costs that are needed for providing a service in the IP core network.

The invention thus advantageously proposes a novel core network architecture that is flexible and (re)configurable, enabling the resources of the network to be managed dynamically and easily. This architecture relies on a control device that is easily programmable, e.g. by developing software functions on top of the control device, and communicating therewith via programming interfaces. It can thus easily accommodate integrating new services proposed by the operators of core networks. The invention thus applies in preferred manner to an LTE/EPC core network architecture.

In a particular embodiment, the control module of the control device is configured to communicate with said at least one router and said at least one switch via the Open-Flow™ protocol.

Using the OpenFlow™ protocol facilitates implementation of the invention.

Furthermore, this protocol makes it possible for the control device to act in real time to collect load and traffic statistics from the routers and the switches of the core network. Thus, not only is the topology of the network taken into account in order to update the processing rules applied by the routers and the switches of the core network, but it also possible to envisage taking account of other factors such as, in particular, the load of that equipment and traffic conditions within the network (e.g. loss of a link), or indeed criteria concerning QoS, resilience, or security for certain data streams.

In an embodiment of the invention, the control module of the control device is suitable for adding, modifying, and/or deleting at least one entry in a flow table stored by said at least one router and/or said at least one switch and reflecting a processing rule.

Correspondingly, the actualizing step of the control method of the invention comprises adding, modifying, and/or deleting at least one entry in a flow table stored by said at least one router and/or said at least one switch and reflecting the processing rule.

The realization of one or the other of these actions depends on the state of the terminal. Thus, by way of example, if the terminal is in a registered state with the core network and is connected to a base station of the access network, then a new entry may be added in the flow table of the router and/or of the switch in order to cause data transmitted to that terminal in downlink to be transferred to that base station.

In another example, if the terminal is in a registered state with the core network but becomes idle, the entry associated with the data streams for that terminal can be deleted from the flow tables, etc. The same applies when the terminal is in a non-registered state.

The control of routers and/or switches by the control device is thus particularly simple to implement by relying on dynamically constructing and updating flow tables in the routers and/or the switches.

In a particular implementation, the control method further comprises, before the reception step, a step of sending a message to the mobility management entity informing it that a said router has received a packet for a terminal that is registered with the core network and that is in an idle IP connectivity state.

The purpose of sending this message is to cause the mobility management entity to trigger a procedure of searching for the terminal so as to urge it to set up a connection with the network in order to be capable of receiving the data packet (and by extension the data stream) for that terminal.

In another implementation, the control method further includes an interrogation step for interrogating a dynamic IP address configuration server of the IP core network in order to obtain a valid IP address for a terminal, the interrogation step being triggered by a message received from the mobility management entity.

This implementation is of particular importance while registering the terminal with the core network, since it enables the terminal to obtain a dynamic IP address via the control device.

It follows from the above that the novel architecture proposed by the invention relies more particularly on two entities of the core network, namely on the above-described (software) control device, and on the mobility management entity with which the control device has a communication interface.

Thus, in another aspect, the invention also provides a mobility management entity for at least one terminal managed by an IP core network, the management entity being connected to at least one base station of an access network and comprising:
   a first communication module for communicating with said at least one base station and suitable for receiving from the base station a message relating to a terminal; and
   a second communication module for communicating with a control device of the IP core network and suitable for transmitting to said control device state information representative of a mobility state and/or an IP connectivity state of the terminal, which information is derived from the message.

Correspondingly, the invention also provides a communication method for communicating with a control device of an IP core network, the method being for implementing by a mobility management entity of the IP core network that is connected to at least one base station of an access network, the method comprising:
   a reception step for receiving from the base station a message about a terminal; and
   a transmission step of sending to the control device of the IP core network state information representative of a mobility state and/or an IP connectivity state of the terminal, which information is derived from the message.

In a particular implementation, the communication method further comprises:
   a reception step for receiving from the control device a message informing the mobility management entity that a router of the IP core network controlled by the control device has received a packet for a terminal that is registered with the IP core network and that is in an idle (inactive) IP connectivity state; and
   a sending step for sending to a base station connected to the mobility management entity a request seeking to trigger connection of the terminal with the base station.

In other words, the message from the control device triggers a procedure for searching for or "paging" the terminal in order to enable it to receive the data for that terminal and stored in the router of the core network.

In yet another aspect, the invention provides an IP core network comprising:
   at least one router to an external data packet network and at least one switch connected to said at least one router, each switch being connected to at least one base station of an access network;
   a control device of the invention and suitable for controlling said at least one router and said at least one switch; and
   a mobility management entity of the invention connected to said at least one base station.

In yet another aspect, the invention also provides a telecommunications system comprising:
   an IP core network of the invention; and
   a plurality of base stations connected to the IP core network via at least one access network.

The mobility management entity, the communication method, the IP core network, and the telecommunications system of the invention benefit from the same advantages as those mentioned above for the control device and the control method of the invention.

In a particular implementation, the various steps of the control method and/or the communication method are determined by computer program instructions.

Consequently, the invention also provides a computer program on a data medium, the program being suitable for being performed in a control device or more generally in a computer, the program including instructions adapted to performing steps of a control method as described above.

The invention also provides a computer program on a data medium, the program being suitable for being performed in a mobility management entity or more generally in a computer, the program including instructions adapted to performing steps of a communication method as described above.

The program may use any programming language and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, such as a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In other embodiments and/or implementations, it is also possible to envisage that the control method, the communication method, the control device, the mobility management entity, and the IP core network of the invention present in combination some or all of the above-specified characteristics.

BRIEF DESCRIPTION OF THE DRAWINGS

Other characteristics and advantages of the present invention appear from the following description made with reference to the accompanying drawings, which show an embodiment having no limiting character. In the figures:

FIGS. 6 to 8 are diagrams showing the main steps respectively of a procedure for attaching a terminal to the core network of FIG. 4, for handing over a terminal between two base stations, and for triggering connection with an idle terminal, as can be implemented by the FIG. 4 core network by using the control and communication methods of the invention.

DETAILED DESCRIPTION OF THE INVENTION

As mentioned above, the invention seeks to implement the principles of an SDN architecture as defined by software within an IP core network, such as for example an LTE/EPC core network, so as to improve the flexibility and the management of resources within the core network. The implementation proposed by the invention also advantageously relies on defining a communication interface with the mobility management entity of the IP core network, thus making it possible to avoid setting up GTP tunnels on top of the UDP/TCP and IP protocols, thereby simplifying the management of terminal mobility within the network.

More precisely, the invention defines a new control plane (signaling) and a new data plane in the IP core network in which a plurality of routers (operating at the level of layer 3 of the open system interconnection (OSI) model of the network) and of switches (operating at the level of layer 2 of the OSI model) connected to base stations of one or more access networks, are all controlled by a centralized control device.

In the presently-described embodiment, the control device is a software control device, that is programmable, and it controls the routers and the switches by using processing rules that are defined and actualized from network topology information via the OpenFlow™ protocol as described in particular in the document "OpenFlow switch specification, Version 1.3.1", September 2012. The network topology information is itself updated from terminal state information returned by the mobility management entity of the IP core network, which has a direct communication interface with the access network base stations of the access network.

Figure 1:
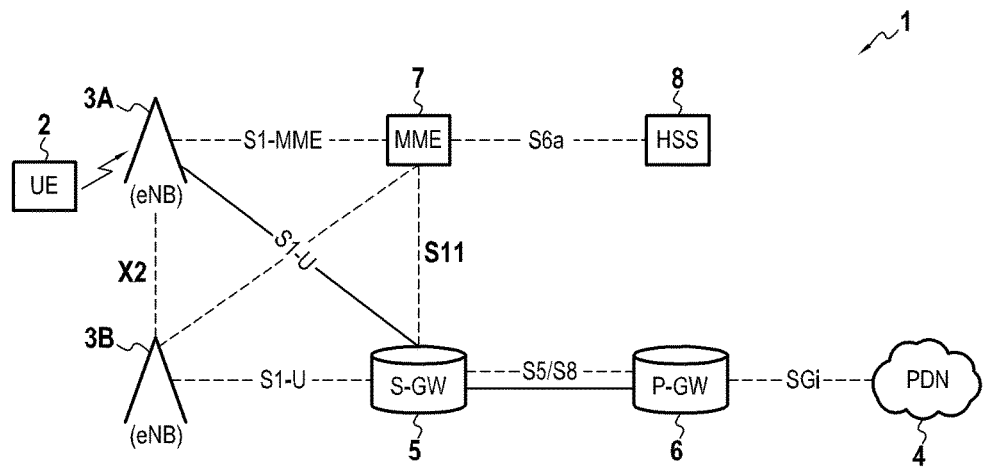
FIG. 1, described above, shows the architecture of an LTE/EPC core network as proposed by the 3GPP consortium.
Figure 2:
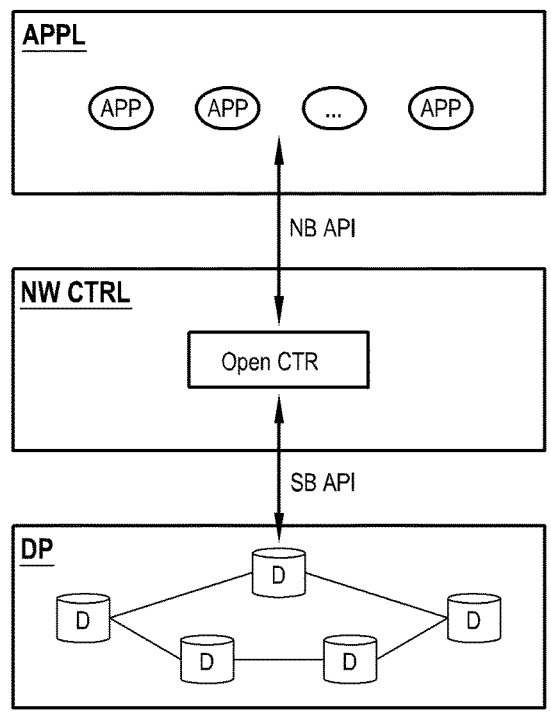
FIGS. 2 and 3 show the principles of a software-defined network (SDN)
Figure 3:
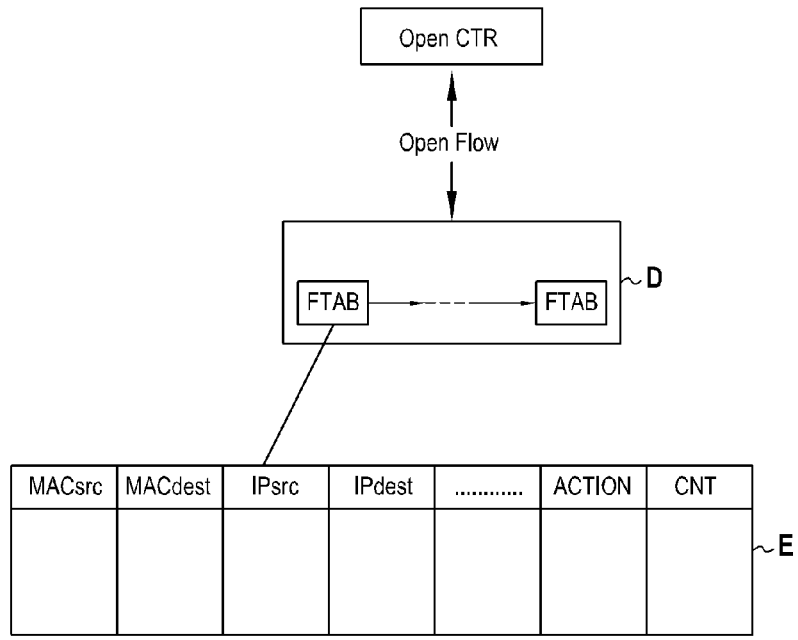

In order to facilitate understanding the invention, the description begins with reference to FIGS. 2 and 3 by briefly summarizing the general principles of an SDN architecture. Such an architecture is described in detail in the document published by the ONF and entitled "Software-defined networking: the new norm for networks", Apr. 13, 2012. In the example used for illustrating these principles, the SDN architecture relies on using the OpenFlow™ protocol.

As mentioned above, the SDN concept serves to specify the behavior of pieces of network equipment by using high level control programs, thus making it easy to automate certain tasks such as configuring pieces of network equipment or managing the policies (or services) that are applied at level of the network.

For this purpose, the SDN architecture centralizes network intelligence (i.e. the functions of controlling the network and its equipment) in a software control device (or controller). The behavior of the equipment of the network in the presence of data relating to a terminal or more precisely to a communication session is then defined by the control device using rules referred to as "processing" or "transfer" rules that are transmitted to the pieces of equipment concerned. These rules are stored in the pieces of network equipment and they are applied by them on receiving data streams or packets. In particular, they specify the pieces of network equipment to which data (i.e. traffic) should be transferred in uplink and downlink.

FIG. 2 summarizes this mode of operation by diagrammatically modeling an SND architecture in three layers:
  a bottom layer DP modeling the data plane and comprising pieces of network equipment D that are controlled by the control device (which pieces of equipment D may equally well be physical or virtual);
  an intermediate layer NW CTRL modeling properly speaking the software control device given the reference "OpenCTR"; and
  a top layer APPL, modeling various APP control functions or applications used by the control device OpenCTR for controlling the pieces of network equipment D in the data plane DP and for preparing the processing rules.

The various above-mentioned layers communicate with one another via application programming interfaces referred to as "NorthBound API" and "SouthBound API" (respectively marked "NB API" and "SB API" in FIG. 3). The programming interfaces SB API between the control device OpenCTR and the data plane in this example make use of the OpenFlow communication protocol. The programming interfaces NB API are based on any open communication protocol, e.g. selected from the following known protocols:

simple object access protocol (SOAP), remote procedure call (RPC), and representational state transfer (REST).

As mentioned above and as shown in FIG. 3, the OpenFlow™ protocol makes it easy for the software control device OpenCTR to control each piece of network equipment D by means of a set of data processing rules, including in particular data transfer (or routing) rules for application by the network equipment on receiving data relating to a communication session (in other words exchanges during a communication session).

These processing rules are determined by the control device OpenCTR, e.g. as a function of the policy envisaged by the operator for managing the network. They specify the processing that is to be applied by each piece of equipment on receiving a packet of a data stream associated with a communication session of a terminal, and when processing subsequent packets associated with the same stream.

These processing rules are stored in each piece of network equipment D in the form of flow tables (FTABs) having inputs that can easily be modified by the control device OpenCTR using the OpenFlow™ protocol (e.g. adding, updating, or deleting entries in the table).

By way of illustration, an entry E in such a flow table FTAB is shown in FIG. 3. It is in the form of a plurality of fields or parameters that are to be examined by the piece of network equipment D on receiving a data packet in order to identify the processing that is to be applied to that packet (e.g. the piece of equipment to which the packet is to be transferred in the core network or in the access network).

Figure 4:
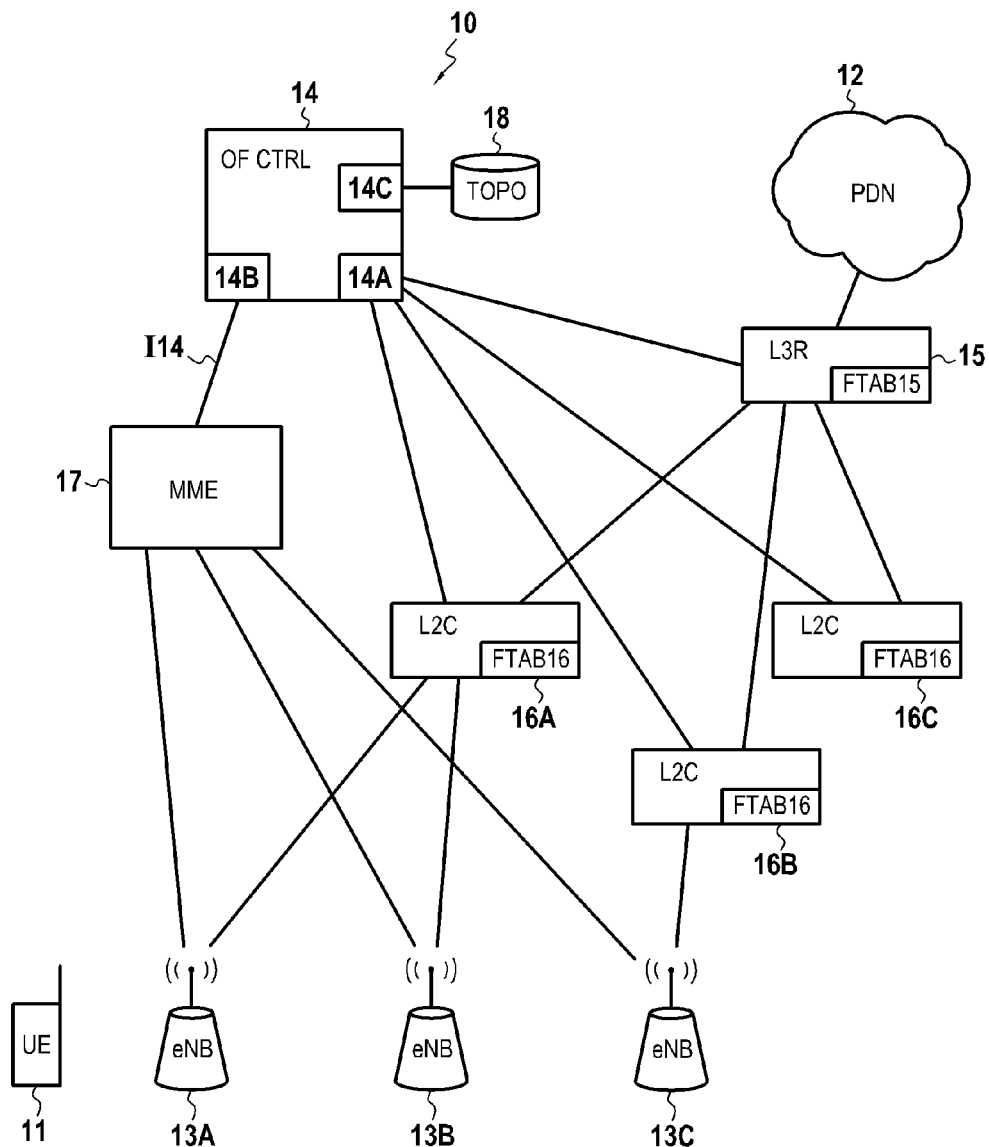
FIG. 4 shows, in their environment, a core network, a control device, and a mobility management entity in accordance with the invention in a particular embodiment.

By way of example, these fields include source and/or destination address fields such as medium access control (MAC) addresses: MACsrc and MACdest; and/or IP addresses: IPsrc and IPdest. One or more fields may be specified for each entry. They specify the addresses that need to be present in the packet headers to which this entry E in the flow table relates. Each entry E in the table also specifies an action field ACTION defining the processing to be applied to the packet corresponding to the entry E. Other fields may naturally also be defined for each entry in the table FTAB in addition to those specified above and as shown in FIG. 4, such as for example a counter field CNT, a field defining an input and/or output port, etc.

A piece of network equipment D uses the flow tables FTAB as defined above in the following manner.

On receiving a data packet, it searches its stored tables FTAB to see whether the MACsrc, MACdest, IPsrc, IPdest field(s) specified in an entry coincide with the field(s) of the header of the packet.

Where appropriate, the instructions associated with the entry in its field ACTION are executed by the piece of network equipment D on the data packet (e.g. transferring the packet to a determined piece of equipment of the network, or modifying or deleting the packet).

In contrast, if no entry coincides with the header of the received packet, the packet is transferred to the control device OpenCTR, which creates a new flow table entry with the associated processing for that entry (in other words a new processing rule), and transfers the entry to the piece of network equipment D for storage in a flow table.

The control and data planes within the SDN architecture are thus indeed decoupled.

With reference to FIGS. 4 to 8, there follows a description of how the invention proposes advantageously to apply this principle to an IP core network architecture, and more particularly to an LTE/EPC core network architecture.

In order to simplify the description, when no details are provided in the description, the operating modes and functions of the piece of network equipment under consideration (in particular base stations of the eNodeB type, mobile terminals of the UE type, and mobility management equipment of the MME type) are similar or identical to those described in the document 3GPP TS 23.401 published by the 3GPP, and they are not described in greater detail herein. Nevertheless, the invention is not limited to LTE telecommunications networks only, and it is also applicable to other architectures of core networks based on the IP protocol (i.e. "all IP networks"), such as for example a proprietary core network architecture.

FIG. 4 shows an LTE/EPC core network 10 in accordance with the invention, in a particular embodiment in which the core network 10 enables a UE terminal 11 to access services made available by an external PDN 12.

In order to access the services, it is assumed in this example that the UE terminal 11 is connected to a base station 13A of an access network (typically a base station of eNodeB type similar to that defined in the document 3GPP TS 23.401), such as for example a UMTS mobile telecommunications network. Nevertheless, no limit is associated with the nature of the access network used by the UE terminal 11 providing it is compatible with the core network 10. Furthermore, the invention can also be applied to a context in which a plurality of access networks and/or a plurality of external PDNs are connected to the IP core network 10.

In accordance with the invention and with the above-summarized SDN principle, the control and data planes are decoupled within the core network 10. This decoupling is provided by a control device 14 in accordance with the invention, using the operating principles of the control device OpenCTR as described above with reference to FIG. 2.

The control device 14 controls various pieces of equipment participating in the access plane of the core network 10, namely:

one or more routers 15 to the external PDN 12 operating at the level of layer 3 in the OSI model; and a plurality of switches 16A, 16B, and 16C connected to the router 15 and operating at the level of layer 2 of the OSI model, each switch 16A, 16B, and 16C (and more generally specified by the reference 16) being connected to one or more base stations of the access network generally specified by the reference 13. In the example shown in FIG. 4, the switch 16A is connected to the base stations 13A and 13B, and the switch 16B is connected to the base station 13C.

Naturally, no limit is attached to the number of routers or to the number of switches connected to the router, nor to the number of base stations connected to the routers.

The control device 14 controls these pieces of equipment via a control module 14A, and it thus prepares the access plane of the core network 10 by defining processing rules for application by the router 15 and by the switches 16 to the IP data packets they receive in uplink and downlink. In this example, these processing rules are IP data packet transfer rules received by the router 15 and by the switches 16, acting as a function of various criteria satisfied by the headers of these packets (e.g. source or destination MAC or IP address, as shown in FIG. 4), to identify the entity to which the packets are to be transferred. Thus, by way of example, for the router 15, one such processing rule identifies one of the switches 16A, 16B, and 16C to which a data packet (and more generally a data stream) is to be transferred as a function of fields present in its header when it is received in downlink. In another example, for the switch 16A, such a processing rule identifies in uplink the router 15 to which a data packet is to be transferred, and in downlink, the base station 13A or 13B of the access network to which a data packet is to be transferred.

In the presently-described example, the control module 14A controls the router 15 and the switches 16 by making use of the OpenFlow™ protocol. More precisely, the processing rules defined by the control module 14A are stored in each router 15 and in each switch 16 in respective flow tables FTAB15 and FTAB16, having entries that can easily be modified (e.g. by adding, updating, or deleting entries in the table) by the control module 14A using the OpenFlow™ protocol. The tables FTAB15 and FTAB16 are similar or identical to the tables FTAB described above with reference to FIG. 3.

Conversely, the router 15 and/or the switches 16 are suitable for calling on the control device 14 via a synchronous message Packet In as defined in the OpenFlow™ protocol when they receive a data packet that does not correspond to any of the entries in their respective flow tables. Since the OpenFlow™ protocol is known to the person skilled in the art, it is not described in further detail herein.

It should be observed that the router 15, the switches 16, and the base stations 13 advantageously exchange IP data packets directly, and not data packets that have been encapsulated using the GTP protocol. Thus, the base stations 13 differ from the eNodeB stations defined in the 3GPP standard in that they now send and receive IP data packets instead of and replacing the GTP packets specified by the 3GPP standard.

In accordance with the invention, the core network 10 also has an entity 17 in accordance with the invention for managing mobility of the network that is connected to the base stations 13 of the access network. This network mobility management entity 17 may for example be similar to an MME entity as defined in document T523.401. Nevertheless, it differs therefrom in that it has a communication interface 114 for communicating with the control device 14 (and more precisely with a communication module 14B of the control device 14), and in that it no longer exchanges with the base stations 13 connected thereto any messages for creating/modifying or terminating GTP tunnels. It should also be observed that in the IP core network architecture proposed by the invention, the S-GW data transfer and the P-GW interconnection gateways are no longer present. They are replaced respectively by switches 16 and by a router 15. Nevertheless, in the presently-described embodiment, no direct interface is provided between the mobility management entity 17 and the switches 16.

The communication interface 114 enables the mobility management entity 17 to inform the control device 14 of the states of the UE terminals (and in particular the state of the terminal 11) served by the base stations 13 or connected thereto. The term "state" of a terminal is used herein to mean a mobility or an IP connectivity state. In the presently-described embodiment, it is envisaged that four terminal states may be reported by the entity 17 to the control device 14, namely:

a state of being registered or not registered with the IP core network 10; and a state of being connected (to a base station of the access network) or idle.

These four states correspond respectively to the following states described in the document 3GPP TS 23.401: EMM (EPS(evolved packet system) mobility management)-registered; EMM-deregistered; ECM(EPS connection management)-connected; and ECM-idle.

In the presently-described embodiment and in the description below, these states are signaled and transmitted to the control device 14 via a new "UE state disclose" message to which the control device responds with a new "UE State Disclose Ack" message.

The terminal state information reported by the mobility management entity 17 may also contain a terminal identifier such as an IMSI, an IP (or MAC) address of the terminals, and/or, where applicable, the IP address of the base station to which the terminal is connected.

The state information is used by the control device 14 via an updating module 14C to update network topology information TOPO.

The topology information TOPO is stored in this example in a database 18 of the core network 10. It models the topology as a network tree (access network and core network), and in particular it represents the connections that exist between the router 15, the switches 16, the base stations 13, and the UE terminals that are registered with the core network 10. The information is initialized with connections set up initially by the operator of the core network 10 between the router 15, the switches 16, and the base stations 13, and it is then actualized as a function of state information returned by the mobility management entity 17 in order to represent the connectivity of the UE terminals and the base stations 13.

This topology information as updated dynamically by the module 14C is used by the control module 14A via the OpenFlow™ protocol to define and/or actualize the rules for processing data packets passing through the core network (in uplink and downlink), which rules are defined to control the router 15 and the switches 16.

Thus, by way of example, when the state information transmitted by the mobility management entity 17 indicates that the UE terminal 11 as identified by its IP address is in a state of being "registered with and connected to a base station 13A of the access network", the control device 14 updates the corresponding topology information in the database 18 and uses the OpenFlow™ protocol to add new entries in the flow tables FTAB15 of the router 15 and FTAB16 of the switch 16A reflecting respectively the connection that exists between the terminal 11 and the base station 13A, between the base station 13A and the switch 16A, and between the switch 16A and the router 15. As a result, an IP data packet for the terminal 11 (in other words a packet having the IP address of the terminal 11 in its header as the destination IP address) coming from the external network 12 and received by the router 15 is transferred by the router to the switch 16A as identified in the router's flow table FTAB15 in association with the IP address of the terminal 11. On receiving this packet, the switch 16A transfers it to the base station 13A identified in its flow table FTAB16 in association with the IP address of the terminal 11. Finally, the base station 13A delivers the packets to the terminal 11.

In another example, when the state information transmitted by the mobility management entity 17 indicates that the UE terminal 11 is in a "registered and idle" state, then the control device 14 uses the OpenFlow™ protocol to delete the entries in the table FTAB15 of the router 15 and FTAB16 of the switch 16A that correspond to the communication parameters used by the terminal 11 (e.g. to its IP address). The same applies when the state information transmitted by the mobility management entity 17 indicates that the UE terminal 11 is in a "non-registered" state.

In yet another example, when the state information indicates that the terminal is in a "registered and connected" state, but that it is now attached to a new base station (e.g. the base station 13B as a result of a handover being executed between the base stations 13A and 13B), the control device 14 uses the OpenFlow™ protocol to modify the entries in the tables FTAB15 of the router 15 and the tables FTAB16 of the switches 16A and 16B so as to reflect this change of base station, so that the IP data packets for the terminal 11 are correctly routed to the base station 13B.

These various examples illustrate actualizing (or updating) in the meaning of the invention of the processing rules that are used by the control device 14 for controlling the router 15 and the switches 16.

In the presently-described embodiment, the control device 14 and the mobility management entity 17 are software entities, in other words applications or computer programs that are executed on respective computer devices or computers 19 and 20.

Figures 5A, 5B:
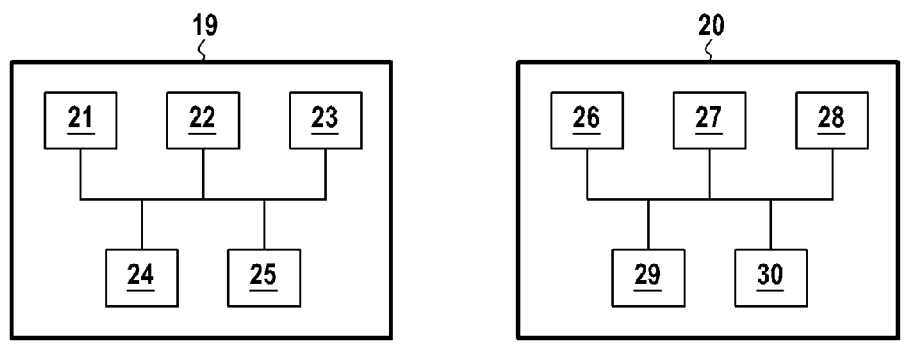
FIGS. 5A and 5B are diagrams showing the hardware architectures of a computer device implementing the control device and of a computer device implementing the mobility management entity as shown in FIG. 4.

FIG. 5A is a diagram showing the hardware architecture of such a computer device 19. This device comprises a processor 21, a ROM 22, a random access memory (RAM) 23, a non-volatile memory 24, and communication means 25 suitable in particular for communicating with the mobility management entity 17 via the interface 114 and with the router 15 and the switches 16 using the OpenFlow™ protocol.

The ROM 22 of the computer device 19 constitutes a data medium in accordance with the invention that is readable by the processor 21 and that stores a computer program in accordance with the invention including instructions for executing steps of a control method of the invention, which steps are described below with reference to FIGS. 6 to 8. The computer program defines in equivalent manner the above-described functional modules 14A, 14B, and 14C.

FIG. 5B is a diagram showing the hardware architecture of a computer device 20 implementing the above-described mobility management entity 17. This device comprises a processor 26, a ROM 27, a RAM 28, a non-volatile memory 29, and communication means 30, suitable in particular for communicating with the control device 14 via the interface 114 and with the base stations 13.

The ROM 27 of the computer device 20 constitutes a data medium in accordance with the invention that is readable by the processor 26 and that stores a computer program in accordance with the invention including instructions for executing steps of a communication method of the invention, which steps are described below with reference to FIGS. 6 to 8.

Figure 7:
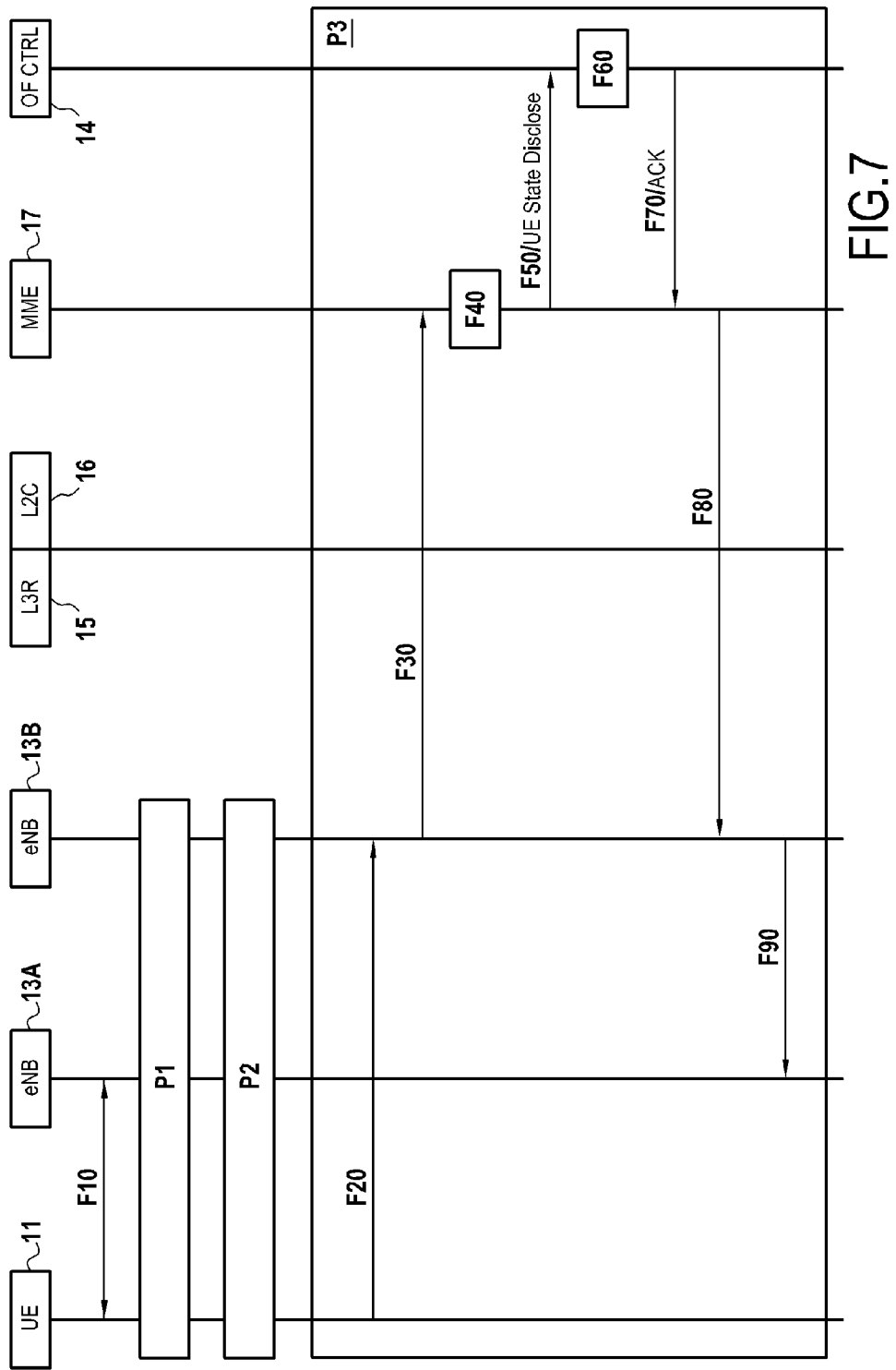
Figure 8:
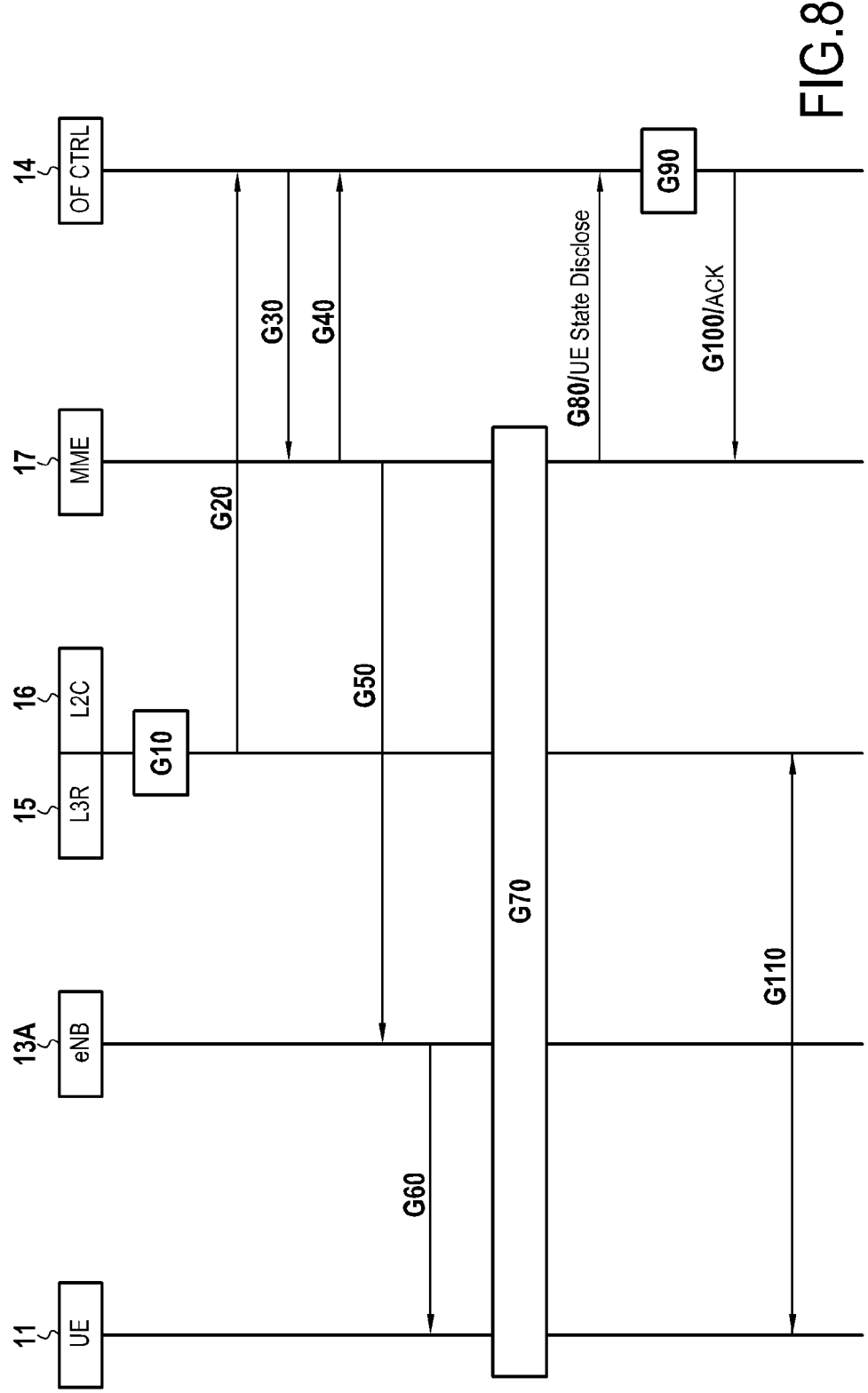

There follows a description in greater detail about how the new core network architecture defined by the invention and how the control and communication methods implemented by elements of this architecture interface easily with the various procedures conventionally implemented in a network, such as a procedure of attaching a terminal to the core network (cf. FIG. 6), a handover procedure between two base stations (cf. FIG. 7), and a "paging" procedure for searching for an idle terminal registered with the core network (cf. FIG. 8). These three procedures, as shown respectively in FIGS. 6 to 8, are based on the corresponding procedures described in document 3GPP TS 23.401, but they are modified so as to incorporate the main steps of the control and communication methods of the invention.

The attachment procedure shown in FIG. 6 enables the UE terminal 11 to register with the core network 10 and obtain a valid IP address for communicating. For simplification purposes, it is assumed that the IP addresses are IPv6 addresses: in known manner, such IP addresses comprise a static portion and a prefix that can be allocated statically or dynamically. The procedure described in FIG. 6 is based on a simplified and modified version of the attachment procedure described in section 5.3.2.1 of the document 3GPP TS 23.401. Steps that are identical to the procedure described in the document 3GPP TS 23.401 are not described again.

It is assumed that the terminal 11 initiates an attachment procedure by sending an Attach Request request to the base station 13A, which request contains in particular an identifier of the terminal such as an IMSI (step E10).

This request is relayed to the mobility management entity 17 (step E20).

A procedure for identifying and authenticating the terminal 11 is then performed in conventional manner by the mobility management entity 17 (step E30).

In the presently-described implementation, the mobility management entity 17 then sends an Update Location Request concerning the terminal 11 to the HSS of the network (not shown in the figures) (step E40). The HSS returns an Update Location Answer with an IPv6 address prefix assigned statically to the terminal 11. The mobility management entity 17 constructs a valid IP address for the terminal 11 on the basis of the prefix it has received from the HSS. The correspondence between the IMSI of the terminal 11 and its IP address is stored in memory by the mobility management entity 17, e.g. in its non-volatile memory 29.

In a variant implementation, the prefix of the IP address allocated to the terminal 11 is allocated dynamically by a conventional dynamic host configuration protocol (DHCP) server for configuring IP addresses.

More precisely, in this variant, at the end of step E30, the mobility management entity 17 sends a message to the control device 14 via the interface 114 in order to obtaining a valid IP address for the terminal 11. In this example, this message is a UE State Disclose message that contains no state information about the terminal 11. Nor does it contain an IP address for the terminal 11 (since such an IP address has not yet been allocated), but it contains only its IMSI (step E40).

On receiving this message, the control device 14 interrogates a DHCP server and obtains an IPv6 prefix that is allocated dynamically by the server to the terminal 11 (step E50). The control device 14 stores, e.g. in its non-volatile memory 24, the IMSI of the terminal 11 in association with the IPv6 prefix that it has thus obtained (step E60). Thereafter, it responds to the mobility management entity 17 with a UE State Disclose Ack message containing the IMSI of the terminal 11 and the IPv6 prefix allocated to the terminal 11 (step E70).

Using the IPv6 prefix (transmitted by the HSS or by the control device 14), and the IMSI of the terminal 11, the mobility management entity 17 initiates a context for the terminal 11 with the base station 13A (in particular it acts on this occasion to verify duplication of the IP address allocated to the terminal 11) (step E80). It sends an Attach Accept message to the base station 13A to accept attachment of the terminal 11. A valid communication link is thus set up between by the entity 17 for the terminal 11.

Thereafter, the base station 13A and the terminal 11 exchange messages in order to set up a radio resource control (RRC) connection as defined in the document TS 23.401 (step E90).

At the end of this step, the base station 13A sends an Initiation Context Response message to the mobility management entity 17 (step E100).

It should be observed that in accordance with the invention and unlike the prior art described in the document TS 23.401, the context initiation messages exchanged between the mobility management entity 17 and the base station 13A in steps E80 and E100 (i.e. the Initiation Context Setup and the Initiation Context Response messages) do not contain any information relating to setting up GTP tunnels, since the invention advantageously makes it possible to omit setting up such tunnels.

Thereafter, the terminal 11 sends an attach complete message to the base station 13A (step E110).

The base station 13A transfers this message to the mobility management entity 17 (step E120). At this stage of the procedure, the terminal 11 is in an EMM-Registered and an ECM-Connected state, i.e. it is registered with the core network 10 and it is connected to a base station of an access network (specifically the base station 13A).

On receiving this message, the mobility management entity 17 determines that the terminal 11 is in a "registered" mobility state and in a "connected" IP connectivity state. It informs the control device 14 of this state by sending it a UE State Disclose message containing the EMM-Registered and the ECM-Connected state information, together with the IPv6 address of the terminal 11, its IMSI and the IP address of the base station 13A to which the terminal 11 is connected (step E130).

As mentioned above, the control device 14 updates the corresponding topology information TOPO with the connection as set up in this way between the terminal 11 and the base station 13A (step E140).

It also actualizes the processing rules that are to be applied by the router 15 and the switches 16 in the presence of data packets for the IP address of the terminal 11 (or for its IMSI) (step E150).

In the presently-described example, it is assumed that the processing rules to be applied by the router 15 and by the switches 16 in the presence of packets coming from the terminal 11 (i.e. in uplink) have previously been defined by the control device 14 on the basis of the connections existing between the router 15, the switches 16, and the base stations 13, and have been transmitted to the router 15 and to the switches 16. The present description relates to the processing rules in downlink.

More particularly, in the presently-described example, the actualizing performed by the control device 14 consists in adding a new entry in the table FTAB16 of the switch 16A that is connected to the base station 13A, this entry specifying that in the presence of a packet having a header that contains the IP address of the terminal 11 as its destination IP address, that packet is to be transferred by the switch 16A to the base station 13A.

The switch 16A in turn actualizes a similar flow table maintained by the base station 13A so that it transfers to the switch 16A IP data packets coming from the terminal 11.

After this actualizing, the control device 14 responds to the mobility management entity 17 by sending it a UE State Disclose Ack message (step E160).

Under such circumstances, uplink data streams (step 170) and downlink data streams (step E180) can be exchanged between the terminal 11 and the external network 12, passing via the router 15, the switch 16A, and the base station 13A.

In the presently-described implementation, it is the mobility management entity 17 that is responsible for creating a valid link for the terminal 11 with the access network, in particular by providing it with a valid IPv6 address. In another implementation, the terminal 11 can request a valid IPv6 address directly from the DHCP server. As mentioned above, the DHCP server is situated between the control device 14 and the router 15. The request sent by the terminal 11 to the DHCP server contains the IMSI of the terminal 11. Since this request is considered as traffic in the data plane, it is routed via the control device 14 to the DHCP server. The terminal 11 is then in charge of verifying duplication of the IP address allocated by the DHCP server. Thereafter, the DHCP server synchronizes with the control device 14 by informing it of the correspondence between the IMSI of the terminal 11 and its IP address.

With reference to FIG. 7, there follows a description of the various steps performed by the mobility management entity 17 and the control device 14 of the core network 10 during a procedure for handover of the terminal 11 between two base stations of the access network, namely between the base station 13A (source base station) and the base station 13B (target base station). The presently-described handover procedure is based on a simplified and modified version of the handover procedure described in section 5.5.1.1.2 of the document 3GPP TS 23.401. Steps that are identical to the procedure described in the document 3GPP TS 23.401 are not described again.

It is assumed that the terminal 11 is participating in an active data session with the base station 13A during this handover (step F10), e.g. as a result of a procedure as described above with reference to FIG. 6 for attaching the terminal 11.

In known manner, a handover procedure takes place in three stages:

- a stage P1 of preparing the handover, during which the base station 13A uses measurements returned by the terminal 11 to determine that a handover of the terminal 11 to a new base station 13B (target station) is required in order to preserve the quality of the radio connection of the terminal 11, and it transmits a request to the base station 13B for handover of the terminal 11;
- a stage P2 in which the handover properly speaking is performed, during which resources are reserved in the base station 13B (or in the target access network) for the terminal 11; and
- a stage P3 of terminating the handover.

The preparation stage P1 and the stage P2 of executing the handover properly speaking are the same as the corresponding stages described in the document 3GPP TS 23.401, and they are not recalled herein.

The same applies to the steps performed during the terminating stage P3 in order to set up an uplink data plane in the network (i.e. with entities of the access network and of the core network 10) (step F20).

The description below relates solely to setting up the downlink data plane and shows more particularly the steps of the control method and of the communication method that are performed respectively by the control device 14 and by the mobility management entity 17 during the handover procedure for the terminal 11.

After step F20, the target base station 13B sends a Path Switch Request to the mobility management entity 17 in order to inform it that the terminal 11 has changed base station (step F30).

On receiving this request, the mobility entity 17 determines that the terminal 11 is now in a registered mobility state and a connected IP connectivity state with the base station 13B (step F40).

It then informs the control device 14 of this state by sending it a UE State Disclose message containing the EMM-Registered state information and the ECM-Connected state information, the IPv6 address of the terminal 11, its IMSI identifier, and the IP address of the base station 13B to which the terminal 11 is now connected (step F50).

On receiving this information, the control device 14 updates the topology information TOPO corresponding to the newly established connection between the terminal 11 and the base station 13B (step F60), as mentioned above.

It also actualizes the processing rules that are to be applied by the router 15 and the switches 16 in the presence of data packets for the IP address of the terminal 11 on the basis of the topology information as updated in this way.

More particularly, if both of the base stations 13A and 13B are connected to the same switch 16A (as shown in FIG. 4), then this actualizing consists in modifying the entry in the table FTAB16 of the switch 16A (and more precisely its ACTION field) so as to indicate that in the presence of a packet having its header containing the IP address of the terminal 11 as its destination IP address, then that packet should be transferred by the switch 16A to the base station 13B.

Otherwise, if the base stations 13A and 13B are connected to distinct switches (e.g. respectively to the switches 16A and 16C), then the actualizing consists in:
modifying the entry in the table FTAB15 of the router 15 so as to indicate that in the presence of a packet containing in its header the IP address of the terminal 11 as its destination IP address, the packet is to be transferred by the router 15 to the switch 16C;
deleting the entry in the table FTAB16 of the switch 16A that has the IP address of the terminal 11 as its destination IP address; and
adding an entry to the table FTAB16 of the switch 16C indicating that in the presence of a packet having in its header the IP address of the terminal 11 as its destination IP address, the packet is to be transferred by the switch 16C to the base station 13B.

The control device 14 responds to the mobility management entity 17 by sending it a UE State Disclose Ack message (step F70).

The mobility management entity 17 then sends an acknowledgment Path Switch Request Ack message to the base station 13B (step F80).

The base station 13B then requests the base station 13A to release the resources that were allocated to the terminal 11 (step F90).

In the attachment and handover procedures described with reference to FIGS. 6 and 7, the UE State Disclose messages containing state information about the terminal 11 are sent to the control device 14 at the initiative of the mobility management entity 17.

FIG. 8 now shows a procedure in which the sending of these messages is triggered by the control device 14. This procedure has a preferred application when the terminal 11 is registered with the core network 10 (and more precisely with the mobility management entity 17), but is in an idle IP connectivity state, in other words it is not connected to a base station of the access network.

In the presently-described implementation, and as mentioned above, in such a context, the flow tables FTAB16 and FTAB15 maintained respectively by the switches 16 and by the router 15 do not contain any entry associated with the IP address of the terminal 11 (it is assumed in this example that the corresponding entries were deleted by the control device 14 as soon as an idle state of the terminal 11 was reported by the mobility management entity 17 to the control device 14).

As a result, when the router 15 receives an incoming IP data packet from the external PDN 12 for the terminal 11 (i.e. having the IP address of the terminal 11 in its header as the destination IP address) (step G10), the router cannot determine from its flow table FTAB15 the switch 16 in the core network 10 to which the packet is to be transferred.

When its flow table FTAB15 has no entry associated with the IP address of the terminal 11, the router 15 stores the incoming packet in a buffer and it interrogates the control device 14 by using a Packet-In message in compliance with the OpenFlow™ protocol (step G20).

The control device 14 then sends a message to the mobility management entity 17 informing it that a router of the core network 10 has received a data packet for the terminal 11 (step G30). In this example, this message contains the IP address of the terminal 11 together with its IMSI, as previously stored by the control device 14.

The mobility management entity 17 acknowledges reception of this message (step G40) and then starts a known procedure of searching for the terminal 11, by sending a so-called "paging request" message to the base stations of the access network that might be serving the terminal 11 (typically in this example to the base station 13A) (step G50). This request is relayed by the base stations and in particular by the base station 13A (step G60). This procedure is identical to the paging procedure described in the document 3GPP TS 23.401, section 5.3.4.3.

On receiving this paging request, the terminal 11 initiates a service request procedure known as the UE Triggered Service Request procedure that is identical to the procedure described in the document 3GPP TS 23.401, section 5.3.4.1, so as to set up a connection with the base station 13A (step G70). This procedure involves steps similar to the step E30 followed by the steps E80 to E120 described above with reference to FIG. 6.

Once the connection has been set up with the base station 13A, the terminal 11 is in an EMM-Registered state and an ECM-Connected state, i.e. it is registered with the core network 10 and it is connected to a base station of an access network (specifically the base station 13A).

The mobility management entity 17 determines that the terminal 11 is in such a state and informs the control device 14 of this state by sending it a UE State Disclose message containing the EMM-Registered state information, the ECM-Connected state information, the IPv6 address of the terminal 11, its IMSI identifier, and also the IP address of the base station 13A to which the terminal 11 is connected (step G80).

The control device 14 then updates the corresponding topology information TOPO with the connection as set up in this way between the terminal 11 and the base station 13A (step G90), as mentioned above.

It also actualizes the processing rules to be applied by the router 15 and by the switches 16 when in the presence of data packets for the IP address of the terminal 11.

More particularly, in the presently-described example, this actualizing consists:
in adding a new entry to the table FTAB15 of the router indicating that in the presence of a packet having in its header the IP address of the terminal 11 as its destination IP address, the packet is to be transferred to the switch 16A connected to the base station 13A; and
in adding a new entry to the table FTAB16 of the switch 16A indicating that in the presence of a packet having in its header the IP address of the terminal 11 as its destination IP address, the packet is to be transferred to the base station 13A.

After this actualizing, the router 15 transfers the incoming data packet to the switch 16A specified in its table FTAB15, and in turn the switch transfers the packet to the base station 13A, which transmits it to the terminal 11.

The control device 14 responds to the mobility management entity 17 by sending it a UE State Disclose Ack message (step G100).

Under such circumstances, downlink data streams (step G110) can be exchanged between the external network 12 and the terminal 11 via the core network 10.

In the presently-described implementation, it is considered that a data stream or packet is identified by the IP address of its destination or its source. Naturally, this assumption is not itself limiting, and other fields of the header of the IP data packet or stream may be taken into consideration for identifying a stream and transferring it in accordance with the invention.

Furthermore, in the presently-described implementation, it is considered that the connections between the routers 15, the switches 16, and the base stations 13 are quasi-static. Nevertheless, in another implementation, it is possible to envisage that the control device 14 also updates those connections as a function of various criteria, such as for example the load on those pieces of equipment and/or traffic conditions, with this being reflected in appropriate processing rules. For example, the control device 14 may be in a position to select or change the router that is used. In another implementation, the control device may have control over elements of the transport network used for interconnecting the switches and the routers, so as to adapt the paths followed by various streams more finely, as a function of criteria relating to QoS, resilience, or security, etc.

The invention claimed is:

1. A computer device for controlling an IP core network, said IP core network comprising at least one router to an external data packet network and at least one switch connected to said at least one router, said at least one switch being connected to at least one base station of an access network, said computer device comprising:
   a processor; and
   a memory storing instructions that, when executed by the processor, cause the processor to:
      communicate with a mobility management entity of the IP core network and receive state information from said mobile management entity that is representative of a mobility state and/or an IP connectivity state of a terminal;
      update topology information representing connections existing between said at least one router, said at least one switch, said at least one base station, and terminals registered with the IP core network, wherein at least some of said topology information is updated as a function of said state information; and
      control said at least one router and/or said at least one switch via processing rules to be applied to data streams for said terminals registered with the IP core network, said processing rules being defined on the basis of said updated topology information.

2. A computer device according to claim 1, wherein said processor is configured to add, modify and/or delete at least one entry in a flow table stored by said at least one router and/or said at least one switch and reflecting a processing rule.

3. A computer device according to claim 1, wherein the processor is configured to communicate with said at least one router and said at least one switch via the OpenFlow™ protocol.

4. A computer having stored thereon instructions for performing a control method according to claim 1 when said instructions are executed by said computer.

5. A non-transitory computer readable storage medium having stored thereon instructions for performing a control method according to claim 1 when said instructions are executed by a processor.

6. An IP core network comprising:
   at least one router to an external data packet network and at least one switch connected to said at least one router, said at least one switch being connected to at least one base station of an access network;
   a first computer device according to claim 1 and suitable for controlling said at least one router and said at least one switch; and
   a second computer device connected to said at least one base station, said second computer device configured to communicate with said at least one base station and receive from said at least one base station a message relating to a terminal; and
   communicate with the first computer device and transmit to said first computer device state information representative of a mobility state and/or an IP connectivity state of said terminal, said state information derived from said message.

7. A computer device according to claim 1, wherein said state information received from the mobility management entity is representative of at least one state selected from the group consisting of:
   a state of being registered or not registered with the IP core network; and
   a state of being connected or idle.

8. A computer device according to claim 1, wherein the processor is configured to control both said at least one router and said at least one switch via the processing rules defined on the basis of said updated topology information.

9. A control method for implementation by a control device for controlling an IP core network comprising at least one router to an external data packet network and at least one switch connected to said at least one router, said at least one switch being connected to at least one base station of an access network, said method comprising:
   receiving state information from a mobility management entity of the IP core network, said state information being representative of a mobility state and/or an IP connectivity state of a terminal;
   as a function of said state information, updating topology information representative of connections existing between said at least one router, said at least one switch, said at least one base station, and terminals registered with the core network; and
   controlling said at least one router and/or at least one switch via processing rules to be applied to data streams for said terminals registered with the IP core network, said processing rules being defined on the basis of said updated topology information.

10. A control method according to claim 9, wherein said state information received from the mobility management entity is representative of at least one state selected from the group consisting of:
   a state of being registered or not registered with the IP core network; and
   a state of being connected or idle.

11. A control method according to claim 9, wherein said state information received from the mobility management entity further comprises an identifier of a base station of an access network to which said terminal is attached and/or an identifier of the terminal.

12. A control method according to claim 9, wherein said controlling comprises adding, modifying, and/or deleting at least one entry in a flow table stored by said at least one router and/or said at least one switch and reflecting a processing rule.

13. A control method according to claim 9, further comprising, prior to said receiving, sending a message to said mobility management entity informing it that a router of the IP core network has received a packet for a terminal that is registered with the IP core network and that is in an idle IP connectivity state.

14. A control method according to claim 9, further comprising interrogating a dynamic IP address configuration server of the IP core network in order to obtain a valid IP address for a terminal, said interrogation process being triggered by a message received from said mobility management entity.

15. A control method according to claim 9, wherein said controlling comprises controlling both said at least one router and said at least one switch via the processing rules defined on the basis of said updated topology information.

16. A computer device of an IP core network, said computer device being connected to at least one base station of an access network and comprising:
   a processor; and
   a memory storing instructions that, when executed by a processor, cause the processor to:
   receive from a control device of the IP core network a message indicating that a router of the IP core network has received a packet for a terminal that is registered with the IP core network and that is in an idle IP connectivity state;
   send to a base station a request seeking to trigger connection of said terminal with said base station;
   communicate with said base station and receive from said base station a message relating to the terminal; and
   communicate with the control device of the IP core network and transmit to said control device state information representative of a mobility state and/or an IP connectivity state of said terminal, said state information derived from said message.

17. A communication method for communicating with a control device of an IP core network, the IP network connected to at least one base station of an access network, the method performed by a mobility management entity of said IP core network and comprising:
   receiving from said control device a message indicating that a router of the IP core network has received a packet for a terminal that is registered with the IP core network and that is in an idle IP connectivity state; and
   sending to a base station connected to said mobility management entity a request seeking to trigger connection of said terminal with said base station;
   receiving from said base station a message about the terminal; and
   sending to said control device of the IP core network state information representative of a mobility state and/or an IP connectivity state of said terminal, said state information derived from said message.

18. A computer having stored thereon instructions for performing the communication method according to claim 17 when said instructions are executed by said computer.

19. A non-transitory computer readable storage medium having stored thereon instructions for performing the communication method according to claim 17 when said instructions are executed by a processor.

* * * * *